United States Patent
Kawamura et al.

(10) Patent No.: US 8,318,863 B2
(45) Date of Patent: Nov. 27, 2012

(54) FOAMING POLYPROPYLENE RESIN COMPOSITION AND PROCESS FOR PRODUCING INJECTION-MOLDED FOAMS FROM THE COMPOSITION

(75) Inventors: Tatsuji Kawamura, Ichihara (JP); Yukio Ishii, Chiba (JP); Ikunori Sakai, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 331 days.

(21) Appl. No.: 12/733,850

(22) PCT Filed: Sep. 19, 2008

(86) PCT No.: PCT/JP2008/066986
§ 371 (c)(1),
(2), (4) Date: Mar. 24, 2010

(87) PCT Pub. No.: WO2009/041361
PCT Pub. Date: Apr. 2, 2009

(65) Prior Publication Data
US 2010/0201016 A1  Aug. 12, 2010

(30) Foreign Application Priority Data
Sep. 28, 2007  (JP) ................................. 2007-254344

(51) Int. Cl.
C08F 8/00 (2006.01)
C08L 23/10 (2006.01)
C08L 23/04 (2006.01)
C08J 9/00 (2006.01)
B22C 1/22 (2006.01)

(52) U.S. Cl. .......... 525/191; 525/240; 521/134; 521/139

(58) Field of Classification Search .................. 525/191, 525/240; 521/134, 139
See application file for complete search history.

(56) References Cited

U.S. PATENT DOCUMENTS

| | | |
|---|---|---|
| 6,773,640 B2 | 8/2004 | Sugihara et al. |
| 7,150,615 B2 | 12/2006 | Sugihara et al. |
| 2005/0006805 A1 | 1/2005 | Sugihara et al. |

FOREIGN PATENT DOCUMENTS

| | | |
|---|---|---|
| JP | 57-31945 | 2/1982 |
| JP | 57-159834 | 10/1982 |
| JP | 60-26049 | 2/1985 |
| JP | 2001-79930 | 3/2001 |
| JP | 2002-79545 | 3/2002 |
| JP | 2002-249635 A | 9/2002 |
| JP | 2003-268145 | 9/2003 |
| JP | 2004-149688 | 5/2004 |

OTHER PUBLICATIONS

English machine translation of JP 2004-149688, retrieved from JPO database Apr. 19, 2012.*
Communication (Supplemental Search Report) EP Appln. No. 08 83 3313.3 dated Jun. 6, 2011.
International Search Report received in corresponding International Application No. PCT/JP2008/066986.

* cited by examiner

Primary Examiner — Nathan M Nutter
(74) Attorney, Agent, or Firm — Foley & Lardner LLP

(57) ABSTRACT

Foaming polypropylene resin compositions are excellent in balance between melt tension and flowability, can give injection-molded foams having superior mechanical strength such as impact resistance, and are suited for the production of automobile parts or the like. Processes of the invention produce injection-molded foams from the compositions.

A foaming polypropylene resin composition according to the present invention includes a polypropylene resin (A) and an ethylene/α-olefin having 3-10 carbon atoms copolymer (B) in a specific ratio; the ethylene/α-olefin having 3-10-carbon atoms copolymer (B) includes a higher molecular weight component (B-H) having $MFR_{190}$ of 1 to 10 g/10 min and a lower molecular weight component (B-L) having $MFR_{190}$ of 20 to 50 g/10 min; and the weight ratio between (B-H) and (B-L), (B-H):(B-L), is in the range of 6:4 to 2:8.

9 Claims, No Drawings

FOAMING POLYPROPYLENE RESIN COMPOSITION AND PROCESS FOR PRODUCING INJECTION-MOLDED FOAMS FROM THE COMPOSITION

FIELD OF THE INVENTION

The present invention relates to foaming polypropylene resin compositions suited for the production of injection-molded foams, and processes for producing injection-molded foams from the compositions. In more detail, the invention relates to foaming polypropylene resin compositions which contain a specific ethylene/α-olefin having 3-10 carbon atoms copolymer and can give injection-molded foams suitably used in automobile parts or the like, and to processes for producing injection-molded foams from the compositions.

BACKGROUND OF THE INVENTION

Polypropylene resins have excellent properties and are used in various fields including automobile parts, machinery parts and electric parts.

Recent automobile parts have been strongly required to be reduced in weight for fuel efficiency, and therefore foamed articles have come into use as automobile interior materials. For further weight reduction in automobiles, it is demanded that articles having an equivalent performance to the conventional level should be manufactured from a less amount of resin. In other words, injection-molded foams with a higher expansion ratio are strongly desired.

Reducing the amount of resin in the foaming results in a thin thickness of the resin placed in a space of a mold (hereinafter, the cavity). As a result, the foam production is very difficult and satisfactory foams cannot be obtained.

In a known injection foaming process, pellets of a raw material thermoplastic resin are directly sprinkled or masterbatched with thermally decomposable chemical foaming agents such as azodicarbonamides, sodium bicarbonate and citric acid. Since the chemical foaming agents are easily available and are usable with a conventional inline injection molding apparatus, they are widely used in injection foaming. However, when the amount of chemical foaming agents mixed with the pellets is increased to expand the resin at a high ratio, the injection foaming tends to result in bad appearance of the foams. In detail, when a chemical foaming agent as a foaming component is added in excess of 5 parts by weight relative to 100 parts by weight of a thermoplastic resin, a higher proportion of the chemical foaming agent is not involved in the foaming and remains unexpanded, and such unexpanded chemical foaming agent present on the surface of the foams deteriorates the appearance. Further, increasing the amount of chemical foaming agents achieves only a limited level of expansion ratio.

Instead of use of the chemical foaming agents, Patent Document 1 discloses that a gaseous or supercritical physical foaming agent is injected at a position on a cylinder of an injection molding machine. This method has enabled the production of foams with good appearance, but costs are increased because the injection molding machine has a specific structure and is complicated in particular when using supercritical physical foaming agent. Although the expansion ratio can be increased by injecting a large amount of the gas, a great number of swirl marks or fine dimples are often caused on the surface. Accordingly, the injection molding with the physical foaming agents is not suited in the industrial fields where the expansion ratio is high to achieve improved rigidity, and the use thereof is rather limited to injection foaming in which the improved size accuracy or cycle reduction is targeted without increasing the expansion ratio.

Accordingly, there has been a need for polypropylene resin compositions that are suited for the production of injection-molded foams and can give foams with a reduced thickness, excellent appearance and superior mechanical properties such as impact resistance.

Patent Document 1: JP-A-2002-79545

SUMMARY OF THE INVENTION

It is an object of the present invention to provide foaming polypropylene resin compositions suited for the production of automobile parts or the like, which compositions are excellent in balance between melt tension and flowability and can give injection-molded foams having superior mechanical strength such as impact resistance. It is another object to provide processes for producing injection-molded foams from the compositions.

A foaming polypropylene resin composition according to the present invention comprises:

50 to 95 parts by weight of a polypropylene resin (A) and 5 to 50 parts by weight of an ethylene/α-olefin having 3-10 carbon atoms copolymer (B) (wherein the total of (A) and (B) is 100 parts by weight), the ethylene/α-olefin having 3-10 carbon atoms copolymer (B) comprising:

a higher molecular weight component (B-H) having a melt flow rate ($MFR_{190}$) of 1 to 10 g/10 min as measured in accordance with ASTM D-1238 (190° C., 2.16 kg load), and a lower molecular weight component (B-L) having a melt flow rate ($MFR_{190}$) of 20 to 50 g/10 min as measured in accordance with ASTM D-1238 (190° C., 2.16 kg load);

the weight ratio between (B-H) and (B-L), (B-H):(B-L), being in the range of 6:4 to 2:8.

In the foaming polypropylene resin composition, the ethylene/α-olefin having 3-10 carbon atoms copolymer (B) is preferably an ethylene/1-butene copolymer.

In a preferred embodiment of the foaming polypropylene resin composition:

the polypropylene resin (A) comprises 70 to 100 parts by weight of a propylene/ethylene block copolymer (A1) and 0 to 30 parts by weight of a propylene homopolymer (A2) (wherein the total of (A1) and (A2) is 100 parts by weight);

the propylene/ethylene block copolymer (A1) comprises a normal temperature p-xylene insoluble part ($X_{insol}$) and a normal temperature p-xylene soluble part ($X_{sol}$);

(i) the normal temperature p-xylene insoluble part ($X_{insol}$) has a melt flow rate ($MFR_{230}$) of 100 to 300 g/10 min as measured in accordance with ASTM D-1238 (230° C., 2.16 kg load);

(ii) the normal temperature p-xylene soluble part ($X_{sol}$) accounts for 5 to 40 wt % of the propylene/ethylene block copolymer (A1); and (iii) the normal temperature p-xylene soluble part ($X_{sol}$) has an ethylene unit content of 15 to 60 wt %.

The foaming polypropylene resin composition preferably has a melt tension at 180° C. ($MT_{180}$) in the range of 0.1 to 2.0 g.

The foaming polypropylene resin composition preferably has a melt flow rate ($MFR_{230}$) of 30 to 200 g/10 min as measured in accordance with ASTM D-1238 (230° C., 2.16 kg load).

The foaming polypropylene resin composition preferably contains an inorganic filler at 0.1 to 30 wt %.

A process for producing injection-molded foams according to the present invention comprises:

adding 0.1 to 10 parts by weight of a foaming agent to 100 parts by weight of the foaming polypropylene resin composition; plasticizing and kneading the mixture with an injection molding apparatus to a plasticized resin composition; and injecting the composition into a cavity of a mold and foaming it while increasing the cavity volume.

EFFECTS OF THE INVENTION

The foaming polypropylene resin compositions of the invention have favorable melt tension and flowability and an excellent balance between foaming properties and injection molding properties, and can give foams having excellent mechanical strength such as impact resistance at a high expansion ratio and in a thin thickness as required. The compositions are suited for applications including automobile parts, electric appliance and building materials.

The processes for producing injection-molded foams according to the present invention can efficiently produce injection-molded foams that have high rigidity and good appearance with low gloss and are suited for applications including automobile parts, electric appliance and building materials.

PREFERRED EMBODIMENTS FOR CARRYING OUT THE INVENTION

The present invention will be described in detail hereinbelow.

Foaming Polypropylene Resin Compositions

The foaming polypropylene resin compositions contain a polypropylene resin (A) and an ethylene/α-olefin having 3-10 carbon atoms copolymer (B) as resin components.

<Polypropylene Resins (A)>

The polypropylene resins (A) used in the foaming polypropylene resin compositions are not limited, and one or more kinds of resins containing propylene as a main component may be used. Examples include propylene homopolymers, propylene/ethylene copolymers and propylene/α-olefin copolymers.

In a preferred embodiment, the polypropylene resin (A) includes a propylene/ethylene block copolymer (A1), and more preferably includes a propylene/ethylene block copolymer (A1) and optionally a propylene homopolymer (A2) as required. In a still more preferred embodiment, the polypropylene resin consists of a propylene/ethylene block copolymer (A1) and optionally a propylene homopolymer (A2) as required.

When the polypropylene resin (A) includes a propylene/ethylene block copolymer (A1) and optionally a propylene homopolymer (A2), the amounts of these polymers are preferably 70 to 100 parts by weight for the propylene/ethylene block copolymer (A1) and 0 to 30 parts by weight for the propylene homopolymer (A2), and more preferably 85 to 100 parts by weight for the propylene/ethylene block copolymer (A1) and 0 to 15 parts by weight for the propylene homopolymer (A2) (wherein the total of (A1) and (A2) is 100 parts by weight).

Propylene/Ethylene Block Copolymers (A1)

In the polypropylene resins (A), the propylene/ethylene block copolymers (A1) are produced by, for example, block copolymerization of propylene and ethylene. For example, propylene is homopolymerized in the first stage in the presence of a stereospecific olefin polymerization catalyst, and propylene is copolymerized with ethylene in the second stage in the presence of the catalyst. Optionally, ethylene may be homopolymerized in the third stage in the presence of the catalyst. The polymerization catalyst may be a Ziegler-Natta catalyst or a metallocene catalyst. Examples of the catalysts include catalyst systems that are composed of a solid catalyst component essentially containing magnesium, titanium, halogen and an electron donor, an organoaluminum compound and an electron donor.

In a preferred embodiment, the propylene/ethylene block copolymer (A1) is a main component of the foaming propylene resin composition.

The propylene/ethylene block copolymer (A1) contains a normal temperature p-xylene insoluble part ($X_{insol}$) and a normal temperature p-xylene soluble part ($X_{sol}$). In the propylene/ethylene block copolymer (A1), the propylene homopolymer moiety and the optional polyethylene moiety are insoluble in normal temperature p-xylene whilst the propylene/ethylene random copolymer moiety is soluble in normal temperature p-xylene.

In the propylene/ethylene block copolymer (A1), the normal temperature p-xylene insoluble part ($X_{insol}$) preferably has a melt flow rate ($MFR_{230}$) of 100 to 300 g/10 min, more preferably 120 to 280 g/10 min, and still more preferably 150 to 250 g/10 min as measured in accordance with ASTM D-1238 (230° C., 2.16 kg load).

In the propylene/ethylene block copolymer (A1), the propylene homopolymer moiety forming the normal temperature p-xylene insoluble part ($X_{insol}$) preferably has an isotactic pentad fraction (mmmm fraction) of not less than 97.5%, and more preferably not less than 98.0%. When the propylene homopolymer moiety has a high isotactic pentad fraction, the resin has high crystallinity and can give foams with high rigidity.

The isotactic pentad fraction (mmmm fraction) is determined by $^{13}C$-NMR. It represents a proportion of isotactic chains among every pentad sequences in a polypropylene molecular chain, or a fraction of the central propylene monomer unit of five consecutively meso-linked propylene monomer units. In more detail, the isotactic pentad fraction is a fraction of mmmm peaks in a $^{13}C$-NMR-spectrum relative to the total absorption peak of the methyl carbon region.

In a preferred embodiment, the normal temperature p-xylene soluble part ($X_{sol}$) accounts for 5 to 40 wt %, more preferably 7 to 30 wt %, and still more preferably 10 to 25 wt % of the propylene/ethylene block copolymer (A1). This proportion of the normal temperature p-xylene soluble part ($X_{sol}$) ensures excellent balance between rigidity and impact resistance.

In another preferred embodiment, the normal temperature p-xylene soluble part ($X_{sol}$) in the propylene/ethylene block copolymer (A1) has an ethylene unit content of 15 to 60 wt %, more preferably 25 to 50 wt %, and still more preferably 30 to 45 wt %.

When the propylene/ethylene block copolymer (A1) satisfies the above properties, the obtainable composition shows excellent foaming properties and can give foams having a good balance between rigidity and impact resistance.

The propylene/ethylene block copolymer (A1) preferably has a melt flow rate ($MFR_{230}$) of about 40 to 300 g/10 min, more preferably 50 to 200 g/10 min, and still more preferably 60 to 150 g/10 min as measured in accordance with ASTM D-1238 (230° C., 2.16 kg load).

The propylene/ethylene block copolymer (A1) may contain a branched olefin polymer at not more than 0.1 wt %, and preferably not more than 0.05 wt %. The branched olefin polymer works as a nucleating agent for the propylene/ethylene block copolymer (A1) and increases the isotactic pentad fraction of the propylene/ethylene block copolymer (A1), resulting in improved molding properties. Examples of such branched olefin polymers include homopolymers of branched olefins such as 3-methyl-1-butene, 3,3-dimethyl-1-butene, 3-methyl-1-pentene, 4-methyl-1-pentene and 3-methyl-1-pentene, and copolymers containing these olefins. Of these, 3-methyl-1-butene is preferred.

The propylene/ethylene block copolymers (A1) may be used singly, or two or more kinds may be used in combination. When two or more kinds thereof are used, all the propylene/ethylene block copolymers (A1) preferably satisfy the above properties.

Propylene Homopolymers (A2)

The propylene homopolymers (A2) which may be used in the polypropylene resin (A) are not particularly limited. The propylene homopolymers usually have a melt flow rate of 30 to 200 g/10 min, preferably 50 to 100 g/10 min, and more preferably 60 to 80 g/10 min as measured in accordance with ASTM D-1238 (230° C., 2.16 kg load).

<Ethylene/α-Olefin Having 3-10 Carbon Atoms Copolymers (B)>

The ethylene/α-olefin having 3-10 carbon atoms copolymers (B) used in the foaming polypropylene resin compositions are copolymers of ethylene and one or more α-olefins of 3 to 10 carbon atoms such as propylene, 1-butene, 1-pentene, 1-hexene, 1-octene and 1-decene. From the viewpoints of impact resistance and easy availability, ethylene/1-butene copolymer, ethylene/1-hexene copolymer and ethylene/1-octene copolymers are preferable, and ethylene/1-butene copolymer is most preferable.

The ethylene/α-olefin having 3-10 carbon atoms copolymers (B) used in the foaming polypropylene resin compositions contain:

a higher molecular weight component (B-H) having a melt flow rate ($MFR_{190}$) of 1 to 10 g/10 min, preferably 2 to 8 g/10 min as measured in accordance with ASTM D-1238 (190° C., 2.16 kg load), and a lower molecular weight component (B-L) having a melt flow rate ($MFR_{190}$) of 20 to 50 g/10 min, preferably 25 to 40 g/10 min as measured in accordance with ASTM D-1238 (190° C., 2.16 kg load).

The higher molecular weight component (B-H) and the lower molecular weight component (B-L) preferably have a weight ratio (B-H):(B-L) in the range of 6:4 to 2:8. When the ethylene/α-olefin having 3-10 carbon atoms copolymer (B) contains the higher molecular weight component and the lower molecular weight component in this ratio, the obtainable foaming polypropylene resin composition is not deteriorated in flowability and can give foams having excellent impact resistance and good appearance.

The higher molecular weight component (B-H) and the lower molecular weight component (B-L) of the ethylene/α-olefin having 3-10 carbon atoms copolymer (B) may be each produced by copolymerizing ethylene and an α-olefin having 3-10 carbon atoms in a gas phase or a liquid phase in the presence of a stereospecific olefin polymerization catalyst. The polymerization catalysts and the polymerization processes are not particularly limited. For example, the polymerization may be performed by a gas phase polymerization process, a solution polymerization process or a bulk polymerization process catalyzed by a Ziegler-Natta catalyst or a metallocene catalyst.

The ethylene/α-olefin having 3-10 carbon atoms copolymers (B) preferably have an ethylene unit content of 40 to 90 mol %, more preferably 40 to 80 mol %, and a unit content of α-olefin having 3-10 carbon atoms of 10 to 60 mol %, more preferably 20 to 60 mol %.

The higher molecular weight component (B-H) and the lower molecular weight component (B-L) may be ethylene/α-olefin copolymers with differing α-olefins or ethylene/α-olefin copolymers with identical α-olefins. As long as the above properties are satisfied, these components may be each a mixture of ethylene/α-olefin copolymers.

<Foaming Polypropylene Resin Compositions>

The foaming polypropylene resin compositions of the present invention include 50 to 95 parts by weight, preferably 60 to 85 parts by weight of the polypropylene resin (A) and 5 to 50 parts by weight, preferably 15 to 40 parts by weight of the ethylene/α-olefin having 3-10 carbon atoms copolymer (B) (wherein the total of (A) and (B) is 100 parts by weight).

The foaming polypropylene resin compositions usually have a melt flow rate ($MFR_{230}$) of 30 to 200 g/10 min, preferably 40 to 120 g/10 min, and more preferably 50 to 100 g/10 min as measured in accordance with ASTM D-1238 (230° C., 2.16 kg load) without containing foaming agents. Such compositions are suited for injection foaming.

The foaming polypropylene resin compositions may contain inorganic fillers. When inorganic fillers are contained, the amount thereof is preferably 0.1 to 30 wt %, and more preferably 1 to 15 wt % in the polypropylene resin composition.

The inorganic fillers for use in the invention are not particularly limited. Examples include heavy calcium carbonate, light calcium carbonate, talc, glass fibers, magnesium carbonate, mica, kaolin, calcium sulfate, barium sulfate, titanium white, white carbon, carbon black, aluminum hydroxide and magnesium hydroxide. These inorganic fillers may be used singly, or two or more kinds may be used in combination. Of these, talc is most preferable.

The foaming polypropylene resin compositions of the invention may contain additives as required while still achieving the objects of the invention. Examples of the additives include nucleating agents, antioxidants, hydrochloric acid absorbers, heat stabilizers, weathering stabilizers, light stabilizers, UV absorbents, lubricants, antistatic agents, flame retardants, pigments, dyes, dispersants, copper inhibitors, neutralizers, plasticizers, crosslinking agents, flow improvers such as peroxides, weld strength improvers, natural oils, synthetic oils and waxes.

The foaming resin compositions of the invention may be suitably used for the production of foams with addition of foaming agents. In particular, the compositions are suited for the production of injection-molded foams. The kinds and amounts of the foaming agents may be determined depending on the chemical make-up of the resin composition and the required properties of foams and in view of gas generation amount from the foaming agents and the desired expansion ratio.

Processes for Producing Injection-Molded Foams

In the processes for producing injection-molded foams according to the invention, foams are manufactured from the foaming polypropylene resin composition and a foaming agent.

The foaming agents used in the processes for the production of injection-molded foams are not particularly limited. Examples include solvent type foaming agents, decomposable foaming agents, gaseous physical foaming agents, and combinations thereof.

The solvent type foaming agents are substances that are absorbed or dissolved in the molten material resin by being added thereto, generally by injection, at a cylinder part of an injection molding apparatus and are thereafter evaporated in an injection mold to function as foaming agents. Examples thereof include low-boiling aliphatic hydrocarbons such as propane, butane, neopentane, heptane, isohexane, hexane, isoheptane and heptane, and low-boiling fluorine-containing hydrocarbons such as chlorofluorocarbon.

The decomposable foaming agents are compounds that are mixed in the material resin composition beforehand and, after fed to an injection molding apparatus, are decomposed under cylinder temperature conditions in the injection molding apparatus to release gas such as carbon dioxide or nitrogen gas. Inorganic foaming agents and organic foaming agents are used. Organic acids such as citric acid and organic acid metal salts such as sodium citrate may be used together as foaming auxiliaries to facilitate the gas production.

Specific examples of the decomposable foaming agents include the following compounds:

(1) inorganic foaming agents: sodium bicarbonate, sodium carbonate, ammonium bicarbonate, ammonium carbonate, ammonium nitrite;

(2) organic foaming agents: (a) N-nitroso compounds: N,N'-dinitrosoterephthalamide, N,N'-dinitrosopentamethylenetetramine; (b) azo compounds: azodicarbonamide, azobisisobutyronitrile, azocyclohexylnitrile, azodiaminobenzene, barium azodicarboxylate; (c) sulfonylhydrazide compounds: benzenesulfonyl hydrazide, toluenesulfonyl hydrazide, p,p'-oxybis(benzenesulfenyl hydrazide), diphenylsulfone-3,3'-disulfonyl hydrazide; (d) azide compounds: calcium azide, 4,4'-diphenyldisulfonyl azide, p-toluenesulfonyl azide.

The gaseous foaming agents are not particularly limited, and general physical foaming agents may be used. Examples include inert gases such as carbon dioxide, nitrogen, argon, helium, neon and astatine. Of these, carbon dioxide, nitrogen and argon are most advantageous because they do not require vaporization, are inexpensive, and are very unlikely to cause environmental pollution or fire. The gaseous foaming agents may be used in supercritical state.

These foaming agents as described above may be used singly or two or more kinds may be used in combination. The foaming agents may be blended in the resin composition beforehand, or may be injected through a part on a cylinder during injection molding.

Of the foaming agents, carbonates or hydrogen carbonates such as sodium hydrogencarbonate are preferably used, desirably in combination with organic carboxylic acids as foaming auxiliaries. The amounts of the carbonate or hydrogen carbonate and the organic carboxylic acid are preferably 30 to 65 parts by weight for the carbonate or hydrogen carbonate and 35 to 70 parts by weight for the organic carboxylic acid, wherein the total of these two is 100 parts by weight. In an embodiment, a masterbatch containing the foaming agent and the foaming auxiliary may be prepared beforehand and be blended with the remaining portion of the foaming polypropylene resin composition.

The amount of the foaming agents may be determined appropriately depending on the required properties of foams and in view of gas generation amount from the foaming agents and the desired expansion ratio. The amount is usually in the range of 0.1 to 10 parts by weight, preferably 0.4 to 5.0 parts by weight, and more preferably 0.7 to 3.0 parts by weight based on 100 parts by weight of the foaming polypropylene resin composition. This amount of the foaming agents ensures that the obtainable foams have a uniform cell diameter and the cells are uniformly dispersed.

In the production processes of the invention, the foaming agent is added to the polypropylene resin composition and the mixture is plasticized and kneaded with an injection molding apparatus to a plasticized resin composition, which is thereafter injected and foamed. The foaming agent may be added to the polypropylene resin composition before they are supplied to an injection molding apparatus. Alternatively, the foaming agent may be fed to an injection molding apparatus in which the polypropylene resin composition is melt-kneaded.

To produce injection-molded foams, the plasticized resin composition is injected from the injection molding apparatus to fill a cavity of a mold and thereafter the plasticized resin composition is foamed while increasing the volume of the cavity.

The mold used in the injection foaming is composed of a fixed mold and a movable mold. These molds are preferably clamped when the plasticized resin composition is injected thereto. The volume of the cavity may be increased by moving backward (core back molding) the movable mold to extend the cavity. In particular, the cavity extension preferably takes place after the passage of an appropriate time after the completion of the injection and filling.

The initial position of the movable mold is such that the fixed mold and the movable mold are most approximate to each other, namely, the mold is clamped, and the cavity volume is smaller than the total volume of the foaming resin composition used in one molding operation. The cavity is shaped similar to the final product. In the invention, the length in extension direction between the fixed mold and the movable mold at the initiation of injection, in other words, the cavity clearance ($T_0$) in the mold at the start of injection is preferably in the range of 1.0 to 2.0 mm, more preferably 1.0 to 1.8 mm, and still more preferably 1.0 to 1.5 mm. If the cavity clearance ($T_0$) is less than 1.0 mm, the cavity is narrow and the plasticized resin composition may not be injected to fill the cavity sufficiently when the plasticized resin composition has a high viscosity or is solidified. If the resin composition is injected at high pressure to achieve sufficient filling, the resin is quenched by the mold and cannot be foamed sufficiently even when the movable mold is moved backward, resulting in foaming failure. Further, high pressure injection increases equipment costs to prevent burrs.

The time of injection of the plasticized resin composition to the mold cavity is not particularly limited, but is preferably about 0.7 to 5.0 seconds, and more preferably about 0.7 to 4.0 seconds. After the completion of the injection, preferably after 0 to 3 seconds after the completion of the injection, the interstructures forming the cavity are moved, preferably at a rate of 1 to 50 mm/sec, and more preferably 1 to 20 mm/sec, thereby increasing the cavity volume. This dwell time permits controlling the thickness of the skin layer. With a longer dwell time, the thickness of the skin layer is increased and thereby mechanical properties such as rigidity are enhanced. The extension ratio of the cavity volume is usually 1.1 to 3.0 times, and preferably 1.5 to 2.5 times.

After the movable mold has been backed, the length ($T_1$) in extension direction in the cross section of the cavity has a ratio to the cavity clearance $T_0$, ($T_1/T_0$), of not less than 1.1, and preferably not less than 1.5. If the $T_1/T_0$ ratio is less than 1.1, the obtainable product is almost unfoamed and cannot achieve the desired rigidity.

In the core back molding, the core travel speed may vary depending on the thickness of the molded articles, the kind of the resins or the foaming agents, the mold temperature and the resin temperature. When carbon dioxide as a physical foaming agent and usual polypropylene are used, the core travel speed is preferably about 0.5 to 30 mm/sec. If the core travel speed is excessively low, the resin is solidified during the core back molding and a sufficient expansion ratio cannot be obtained. At an excessively high speed, the cell formation and growth cannot keep up with the traveling of the core, and the cells are broken to deteriorate the appearance of the foams.

The temperatures of the injected resin and the mold may vary depending on the thickness of the molded articles, the kind of the resins, and the kind or amount of the foaming agents. Typical temperatures in the molding of polypropylene resins may be adopted. It is recommended that the mold temperature is increased from the normal level when producing thin foams or foams at a high expansion ratio. In detail, the temperature of the injected resin may be 170 to 250° C., and preferably 180 to 220° C. The temperature of the fixed mold and the movable mold may be 10 to 100° C., and preferably 30 to 80° C. The pressure in the mold may be 5 to 30 MPa, and preferably 10 to 15 MPa. The injection is preferably carried out at a pressure higher than the clamping pressure to the fixed mold and the movable mold. The injection pressure is usually in the range of 10 to 200 MPa, and preferably 12 to 150 MPa.

According to the present invention, the resin composition is injected to a cavity at a time and is thereafter foamed, whereby the resin in contact with the mold is solidified faster than the inner resin. Consequently, the resultant foams have an unfoamed skin layer on the surface which provides and maintains a solid product shape. Thus, the foams obtained according to the invention have high rigidity. The smoothness and rigidity of the skin layer ensure good appearance even when the cell shape, the cell density or the expansion ratio is more or less nonuniform inside the foams. The thickness of the skin layer is not particularly limited, but is preferably not less than 0.1 mm, and more preferably not less than 0.3 mm. The timing of carrying out the core back molding to form the skin layer in the above thickness varies depending on the kind of the resins or the foaming agents, the mold temperature and the resin temperature. When usual polypropylene is used, the core back molding is preferably performed after about 0.5 to 3 seconds after the completion of the injection and filling. If the time is short between the completion of the injection/filling and the core back molding, the skin layer does not have a sufficient thickness. If the time is excessively long, the resin solidification proceeds and a sufficient expansion ratio cannot be obtained by the core back molding.

The expansion ratio may be controlled appropriately by the resin temperature, the injection rate, the dwell time between the injection/filling completion and the start of the core back molding, the core back length, the core travel speed and the cooling time after the core back molding. The expansion ratio is preferably 1.1 to 3.0 times. The core back molding may be performed in several stages, in which case the cell structure or edge shapes of the foams can be controlled.

In the invention, hot runners, shut-off nozzles and shut-off gates generally used in injection molding may be employed. The shut-off nozzles or hot runners prevent the occurrence of waste resins such as runners and also prevent the propylene resin composition from leaking from the mold to the cavity to cause defects on the foams manufactured in the subsequent cycle.

After the foaming, the foams may be cooled and collected directly. In an embodiment, the mold may be slightly clamped to control the contact between the foam and the mold, and thereby the molding cycles may be shortened and the obtainable foams have the desired recess or cell shape.

According to the processes of the invention, injection-molded foams having a thickness of, for example, about 1.2 to 5.0 mm may be favorably produced. When the injection-molded foam has closed cells, the average cell diameter is about 0.01 to 1.0 mm. Depending on the shape or use of the foams, the cell diameter may be several millimeters or some of the cells may be connected to form an open cell. At a high expansion ratio in particular, a plurality of cells aggregate to form open cells and the foam becomes hollow. In this case, the resin forms pillar's in the hollow, and the foams are very lightweight and have very high rigidity. Such foams may be suitably used in various fields including automobile interior and exterior parts, cardboard substitutes, electric appliance and building materials.

EXAMPLES

The present invention will be described in greater detail based on Examples hereinbelow without limiting the scope of the invention.

Foams obtained in Examples and Comparative Examples were measured or evaluated for appearance, molding properties and Izod impact strength by the following methods.

(1) Appearance

The surface of a foam was visually observed and evaluated based on the following criteria.

[Silver Streaks]

A: Almost no silver streaks were observed.

B: Silver streaks were observed past half the flow length of the surface of the foam.

C: Silver streaks were observed on the entire surface of the foam.

(2) Molding Properties

Molding properties were evaluated based on thin injection molding properties, load on the injection molding apparatus by the injection pressure, and uniformity in thickness of the foam.

A: The injection pressure of the molding apparatus was not more than 130 MPa, and the thickness variation in the entire foam surface was not more than ±0.1 mm.

B: The maximum injection pressure of the molding apparatus was from 130 to 160 MPa, or the thickness variation in the entire foam surface was in the range of ±0.1 to ±0.3 mm.

C: The maximum injection pressure of the molding apparatus was not less than 160 MPa, or the thickness variation in the entire foam surface was not less than ±0.3 mm.

(3) Izod (IZ) Impact Strength

Izod impact strength test was made with respect to unfoamed test pieces. An Izod impact strength tester manufactured by TOYO SEIKI SEISAKU-SHO, LTD. was used. An end of a V-notched test piece in accordance with ASTM D 256 was fixed. A pendulum hammer having a hammer energy of 3.92 J was allowed to hit an upper portion of the test piece at a lift angle of 150°, and the energy (J/m) required for breakage was obtained. The test was performed at a temperature of 23° C. and −30° C.

A: IZ testing at 23° C. resulted in no breakage or partial breakage, and the IZ impact strength at −30° C. was not less than 30 J/m.

B: IZ testing at 23° C. resulted in hinge breakage, or the IZ impact strength at −30° C. was in the range of 25 to 30 J/m.

C: IZ testing at 23° C. resulted in complete breakage, or the IZ impact strength at −30° C. was not more than 25 J/m.

Example 1

An injection foaming resin composition was prepared by mixing 70 parts by weight of a Ziegler-Natta catalyzed propylene/ethylene block copolymer (A) which had $MFR_{230}$ of 95 (g/10 min) and in which a propylene homopolymer moiety (normal temperature p-xylene insoluble part ($X_{insol}$)) had MFR of 180 (g/10 min) and an isotactic pentad fraction of 97.5%, and the content of normal temperature p-xylene soluble part ($X_{sol}$) was 12%; 5 parts by weight of a higher molecular weight ethylene/1-butene copolymer (B) (A-6050 manufactured by Mitsui Chemicals, Inc.) having $MFR_{190}$ of 6; 15 parts by weight of a lower molecular weight ethylene/1-butene copolymer (C) (A-35070S manufactured by Mitsui Chemicals, Inc.) having MFR$_{190}$ of 35; and 10 parts by weight of fine powdery talc (D). The composition was pelletized. A foaming agent masterbatch was prepared by kneading a low-density polyethylene with a 1:1 foaming agent mixture of sodium bicarbonate and sodium citrate at a foaming agent concentration of 30 wt %. The pellets were dry blended with the masterbatch such that the concentration of the foaming agent components was 0.9 wt %. The blend was injection molded under the following conditions to give a foam. The foam was evaluated for properties, the results being set forth in Table 1.

The molding conditions were as follows.

Injection molding apparatus: MD850S-III manufactured by UBE MACHINERY CORPORATION, LTD.

Molded article size: flat plate 80 cm in length, 50 cm in width and 3 mm in thickness Gate structure: valve gate, direct gate at the center of foam Injection temperature: 190° C.

Injection time: 1.0 second (from the initiation of injection to the completion of the injection of the whole material)

Core back speed: 10 mm/sec

Delay time: 0.0 second

Foaming time: 1.0 second

Mold surface temperature: 50° C.

Initial mold clearance (L$_0$): 2.0 mm

Mold clearance at completion of the foaming step (L$_1$): 3.0 mm

Example 2

A foam was produced and the properties were measured in the same manner as in Example 1, except that the injection time was changed to 2.0 seconds. The results are set forth in Table 1.

Example 3

A foam was produced and the properties were measured in the same manner as in Example 1, except that the delay time was changed to 2.0 seconds. The results are set forth in Table 1.

Example 4

A foam was produced and the properties were measured in the same manner as in Example 1, except that the propylene/ethylene block copolymer (A) (70 parts by weight) was replaced by 35 parts by weight of a Ziegler-Natta catalyzed propylene/ethylene block copolymer (A-1) which had MFR$_{230}$ of 90 (g/10 min) and in which a propylene homopolymer moiety (normal temperature p-xylene insoluble part (X$_{insol}$)) had MFR$_{230}$ of 200 (g/10 min) and an isotactic pentad fraction of 97.5%, and the content of normal temperature p-xylene soluble part (X$_{sol}$) was 11%; and 35 parts by weight of a Ziegler-Natta catalyzed propylene/ethylene block copolymer (A-2) which had. MFR$_{230}$ of 110 (g/10 min) and in which a propylene homopolymer moiety (normal temperature p-xylene insoluble part (X$_{insol}$)) had MFR$_{230}$ of 240 (g/10 min) and an isotactic pentad fraction of 97.5%, and the content of normal temperature p-xylene soluble part (X$_{sol}$) was 10%. The results are set forth in Table 1.

Example 5

An injection foaming resin composition was prepared by mixing 70 parts by weight of a Ziegler-Natta catalyzed propylene/ethylene block copolymer (A) which had MFR$_{230}$ of 110 (g/10 min) and in which a propylene homopolymer moiety (normal temperature p-xylene insoluble part (X$_{insol}$)) had MFR$_{230}$ of 240 (g/10 min) and an isotactic pentad fraction of 97.5%, and the content of normal temperature p-xylene soluble part (X$_{sol}$) was 10%; 8 parts by weight of a higher molecular weight ethylene/1-butene copolymer (B) (A-4050S manufactured by Mitsui Chemicals, Inc.) having MFR$_{190}$ of 4; 8 parts by weight of a lower molecular weight ethylene/1-butene copolymer (C) (A-35070S manufactured by Mitsui Chemicals, Inc.) having MFR$_{190}$ of 35; and 14 parts by weight of fine powdery talc (D). The composition was pelletized. The pellets were dry blended with the foaming agent masterbatch used in Example 1 such that the concentration of the foaming agents was 0.9 wt %. The blend was injection molded under the conditions as described in Example 1 to give a foam. The foam was evaluated for properties, the results being set forth in Table 1.

Example 6

An injection foaming resin composition was prepared by mixing 67 parts by weight of a Ziegler-Natta catalyzed propylene/ethylene block copolymer (A) which had MFR$_{230}$ of 110 (g/10 min) and in which a propylene homopolymer moiety (normal temperature p-xylene insoluble part (X$_{insol}$)) had MFR$_{230}$ of 240 (g/10 min) and an isotactic pentad fraction of 97.5%, and the content of normal temperature p-xylene soluble part (X$_{sol}$) was 10%; 5 parts by weight of a Ziegler-Natta catalyzed propylene homopolymer (A') in which a propylene homopolymer moiety (normal temperature p-xylene insoluble part (X$_{insol}$)) had MFR$_{230}$ of 220 (g/10 min) and, an isotactic pentad fraction of 97.8%; 8 parts by weight of a higher molecular weight ethylene/1-butene copolymer (B) (A-4050S manufactured by Mitsui Chemicals, Inc.) having MFR$_{190}$ of 4; 8% by weight of a lower molecular weight ethylene/1-butene copolymer (C) (A-35070S manufactured by Mitsui Chemicals, Inc.) having MFR$_{190}$ of 35; and 12 parts by weight of fine-powdery talc (D). The composition was pelletized. The pellets were dry blended with the foaming agent masterbatch used in Example 1 such that the concentration of the foaming agents was 0.9 part by weight. The blend was injection molded under the conditions as described in Example 1 to give a foam. The foam was evaluated for properties, the results being set forth in Table 1.

Comparative Example 1

A foam was produced and the properties were measured in the same manner as in Example 1, except that the higher molecular weight ethylene/1-butene copolymer (B) (5 parts by weight) and the lower molecular weight ethylene/1-butene copolymer (C) (15 parts by weight) were replaced by 20 parts by weight of an ethylene/1-butene copolymer (A-20085 manufactured by Mitsui Chemicals, Inc.) having MFR$_{190}$ of 23. The results are set forth in Table 1.

Comparative Example 2

A foam was produced and the properties were measured in the same manner as in Comparative Example 1, except that the propylene/ethylene block copolymer (A) (70 parts by weight) was replaced by 70 parts by weight of a Ziegler-Natta catalyzed propylene/ethylene block copolymer which had MFR$_{230}$ of 55 and in which a propylene homopolymer moiety (normal temperature p-xylene insoluble part (X$_{insol}$)) had MFR$_{230}$ of 80 (g/10 min) and an isotactic pentad fraction of 94.6%, and the content of normal temperature p-xylene soluble part ($X_{sol}$) was 14%. The results are set forth in Table 1.

Comparative Example 3

A foam was produced and the properties were measured in the same manner as in Example 1, except that the higher molecular weight ethylene/1-butene copolymer (A) (5 parts by weight) and the lower molecular weight ethylene/1-butene copolymer (C) (15 parts by weight) were replaced by 20 parts by weight of the higher molecular weight ethylene/1-butene copolymer (B). The results are set forth in Table 1.

Comparative Example 4

A foam was produced and the properties were measured in the same manner as in Example 1, except that the higher molecular weight ethylene/1-butene copolymer (B) (5 parts by weight) and the lower molecular weight ethylene/1-butene copolymer (C) (15 parts by weight) were replaced by 20 parts by weight of the lower molecular weight ethylene/1-butene copolymer (C). The results are set forth in Table 1.

TABLE 1

| | | | | Ex. 1 | Ex. 2 | Ex. 3 | Ex. 4 | Ex. 5 | Ex. 6 |
|---|---|---|---|---|---|---|---|---|---|
| Composition | A | Propylene/ethylene block copolymer | Homopolypropylene segment's MFR 100-300 | 70 | 70 | 70 | 35 + 35 | 70 | 67 |
| | | Propylene/ethylene block copolymer | Homopolypropylene segment's MFR less than 100 | — | — | — | — | — | — |
| | | Propylene homopolymer | | | | | | | 5 |
| | B | Ethylene/1-butene copolymer | MFR (190° C.) 4 | — | — | — | — | 8 | 8 |
| | | Ethylene/1-butene copolymer | MFR (190° C.) 6 | 5 | 5 | 5 | 5 | — | — |
| | C | Ethylene/1-butene copolymer | MFR (190° C.) 35 | 15 | 15 | 15 | 15 | 8 | 8 |
| | | Ethylene/1-butene copolymer | MFR (190° C.) 20 | — | — | — | — | — | — |
| | D | Talc | | 10 | 10 | 10 | 10 | 14 | 12 |
| Molding conditions | Injection time | | (sec) | 1.0 | 2.0 | 1.0 | 1.0 | 1.0 | 1.0 |
| | Core back speed | | (mm/sec) | 10 | 10 | 10 | 10 | 10 | 10 |
| | Delay time | | (sec) | 0.0 | 0.0 | 2.0 | 2.0 | 0.0 | 0.0 |
| Properties | MFR (230° C.) | | (g/10 min) | 65 | 65 | 65 | 70 | 72 | 74 |
| | MT (180° C.) | | (g) | 0.46 | 0.46 | 0.46 | 0.45 | 0.45 | 0.41 |
| Evaluation | Appearance | | | A | A | A | A | A | A |
| | Molding properties (Flowability) | | | A | A | A | A | A | A |
| | Impact resistance | | | A | A | A | A | A | A |

| | | | | Comp. Ex. 1 | Comp. Ex. 2 | Comp. Ex. 3 | Comp. Ex. 4 |
|---|---|---|---|---|---|---|---|
| Composition | A | Propylene/ethylene block copolymer | Homopolypropylene segment's MFR 100-300 | 70 | — | 70 | 70 |
| | | Propylene/ethylene block copolymer | Homopolypropylene segment's MFR less than 100 | — | 70 | — | — |
| | | Propylene homopolymer | | | | | |
| | B | Ethylene/1-butene copolymer | MFR (190° C.) 4 | — | — | — | — |
| | | Ethylene/1-butene copolymer | MFR (190° C.) 6 | — | — | 20 | — |
| | C | Ethylene/1-butene copolymer | MFR (190° C.) 35 | — | — | — | 20 |
| | | Ethylene/1-butene copolymer | MFR (190° C.) 20 | 20 | 20 | — | — |
| | D | Talc | | 10 | 10 | 10 | 10 |
| Molding conditions | Injection time | | (sec) | 1.0 | 1.0 | 1.0 | 1.0 |
| | Core back speed | | (mm/sec) | 10 | 10 | 10 | 10 |
| | Delay time | | (sec) | 0.0 | 0.0 | 0.0 | 0.0 |
| Properties | MFR (230° C.) | | (g/10 min) | 70 | 31 | 59 | 79 |
| | MT (180° C.) | | (g) | 0.39 | 0.74 | 0.51 | 0.37 |
| Evaluation | Appearance | | | A | B | B | A |
| | Molding properties (Flowability) | | | A | C | B | A |
| | Impact resistance | | | B | A | A | B-C |

The results of Comparative Examples 1 to 4 in Table 1 show that when an ethylene/α-olefin having 3-10 carbon atoms copolymer having a high molecular weight, a low molecular weight or an intermediate molecular weight is used singly, it is difficult that the appearance, molding properties and impact resistance are well balanced. In contrast, Examples 1 to 6 according to the present invention in which a higher molecular weight ethylene/α-olefin having, 3-10 carbon atoms copolymer and a lower molecular weight ethylene/α-olefin having 3-10 carbon atoms copolymer were used together at a specific ratio resulted in compositions having excellent molding properties, and the foams produced therefrom had good appearance and impact resistance.

Industrial Applicability

The foaming polypropylene resin compositions of the invention have excellent molding properties and can give foams with superior rigidity. The compositions are thus favorably used to produce injection-molded foams suited as automobile parts or the like. The processes for producing injection-molded foams according to the invention can produce foams that have an inner foam layer and a surface skin layer that are formed of the identical material as a whole. The foams obtained according to the invention have good surface properties and are lightweight and excellent in rigidity and impact resistance, thus being favorably used in products such as automobile interior and exterior parts, electric appliance and building materials.

The invention claimed is:

1. A foaming polypropylene resin composition comprising:
    50 to 95 parts by weight of a polypropylene resin (A) and
    5 to 50 parts by weight of an ethylene/α-olefin having 3-10 carbon atoms copolymer (B) (wherein the total of (A) and (B) is 100 parts by weight),
    the ethylene/α-olefin having 3-10 carbon atoms copolymer (B) comprising:
        a higher molecular weight component (B-H) having a melt flow rate ($MFR_{190}$) of 1 to 10 g/10 min as measured in accordance with ASTM D-1238 (190° C., 2.16 kg load), and
        a lower molecular weight component (B-L) having a melt flow rate ($MFR_{190}$) of 20 to 50 g/10 min as measured in accordance with ASTM D-1238 (190° C., 2.16 kg load);
    the weight ratio between (B-H) and (B-L), (B-H):(B-L), being in the range of 6:4 to 2:8.

2. The foaming polypropylene resin composition according to claim 1, wherein the ethylene/α-olefin having 3-10 carbon atoms copolymer (B) is an ethylene/1-butene copolymer.

3. The foaming polypropylene resin composition according to claim 1, wherein:
    the polypropylene resin (A) comprises 70 to 100 parts by weight of a propylene/ethylene block copolymer (A1) and 0 to 30 parts by weight of a propylene homopolymer (A2) (wherein the total of (A1) and (A2) is 100 parts by weight);
    the propylene/ethylene block copolymer (A1) comprises a normal temperature p-xylene insoluble part ($X_{insol}$) and a normal temperature p-xylene soluble part ($X_{sol}$);
    (i) the normal temperature p-xylene insoluble part ($X_{insol}$) has a melt flow rate ($MFR_{230}$) of 100 to 300 g/10 min as measured in accordance with ASTM D-1238 (230° C., 2.16 kg load);
    (ii) the normal temperature p-xylene soluble part ($X_{sol}$) accounts for 5 to 40 wt % of the propylene/ethylene block copolymer (A1); and
    (iii) the normal temperature p-xylene soluble part ($X_{sol}$) has an ethylene unit content of 15 to 60 wt %.

4. The foaming polypropylene resin composition according to claim 1, which has a melt tension at 180° C. ($MT_{180}$) in the range of 0.1 to 2.0 g.

5. The foaming polypropylene resin composition according to claim 1, which has a melt flow rate ($MFR_{230}$) of 30 to 200 g/10 min as measured in accordance with ASTM D-1238 (230° C., 2.16 kg load).

6. The foaming polypropylene resin composition according to claim 1, which further comprises an inorganic filler at 0.1 to 30 wt %.

7. The foaming polypropylene resin composition according to claim 3, which has a melt tension at 180° C. ($MT_{180}$) in the range of 0.1 to 2.0 g.

8. The foaming polypropylene resin composition according to claim 3, which has a melt flow rate ($MFR_{230}$) of 30 to 200 g/10 min as measured in accordance with ASTM D-1238 (230° C., 2.16 kg load).

9. The foaming polypropylene resin composition according to claim 3, which further comprises an inorganic filler at 0.1 to 30 wt %.

* * * * *